(No Model.)

W. H. SMYTH.
MACHINE FOR HEADING CANS.

No. 403,784. Patented May 21 1889.

Witnesses:
Geo. W. Ueffinger.
J. B. Course.

Inventor.
W. H. Smyth.

(No Model.) 9 Sheets—Sheet 3.

W. H. SMYTH.
MACHINE FOR HEADING CANS.

No. 403,784. Patented May 21 1889.

(No Model.)

W. H. SMYTH.
MACHINE FOR HEADING CANS.

No. 403,784. Patented May 21 1889.

Witnesses:
Geo. W. Ueffinger.

Inventor.
W. H. Smyth (No Model.) 9 Sheets—Sheet 6.
W. H. SMYTH.
MACHINE FOR HEADING CANS.

No. 403,784. Patented May 21 1889.

Witnesses: Geo. W. Ueffinger. J. H. Krouse.

Inventor. W. H. Smyth.

(No Model.) 9 Sheets—Sheet 8.

W. H. SMYTH.
MACHINE FOR HEADING CANS.

No. 403,784. Patented May 21 1889.

Witnesses:
Geo. W. Uffinger.
Geo. H. Strong

Inventor.
W. H. Smyth (No Model.) 9 Sheets—Sheet 9.

W. H. SMYTH.
MACHINE FOR HEADING CANS.

No. 403,784. Patented May 21 1889.

Witnesses.
Geo. W. Ueffinger.
Geo. H. Strong.

Inventor.
W. H. Smyth

UNITED STATES PATENT OFFICE.

WILLIAM H. SMYTH, OF BERKELEY, CALIFORNIA.

MACHINE FOR HEADING CANS.

SPECIFICATION forming part of Letters Patent No. 403,784, dated May 21, 1889.

Application filed November 22, 1888. Serial No. 291,593. (No model.)

*To all whom it may concern:*

Be it known that I, WILLIAM H. SMYTH, of Berkeley, Alameda county, State of California, have invented an Improvement in Machines for Heading Cans; and I hereby declare that the following is a full, clear, and exact description of the same.

My invention relates to the class of can-making machines, and especially to machines of this class adapted for putting the heads on the cans.

My invention consists in the mechanisms and combinations of mechanisms hereinafter fully described, and specifically pointed out in the claims.

The object of the invention is to provide a machine simple in construction and rapid and accurate in operation.

Referring to the accompanying drawings for a more complete explanation.

A is the open-topped frame or stand of the machine. Upon it is mounted and adapted to be reciprocated the carriage B. This is a four-sided frame having neither bottom nor top. Its ends are concaved on their inner surface and form the receiving-jaws $b$.

C is a cross-head mounted and adapted to be reciprocated upon the stand A and lying under the carriage B and between its sides. The ends of the cross-head are concaved and form the clamping-jaws $c$.

A reciprocating motion is imparted to the cross-head C by means of the drive-shaft D, having a crank or belt pulley, $d$, and a pinion, $d'$, on its other end, which meshes with a toothed crank-wheel, $e$, on a counter-shaft, E, the other end of which carries a crank-wheel, $e'$. From the wrist-pins of both crank-wheels extend connecting-rods $e^2$, one on each side of the machine, their other ends being connected with the side pins, $c'$, of the sliding cross-head C.

The carriage derives its movement from the stroke of the cross-head through the intervention of the can-body lying between the clamping-jaws of the cross-head and the receiving-jaws of the carriage, said cross-head thereby moving said carriage back and forth at each stroke and up to the limits of the movement of the cross-head. The carriage has no other movement than that which it receives from the cross-head, as just explained.

Figures 3, 10, 11, 12:
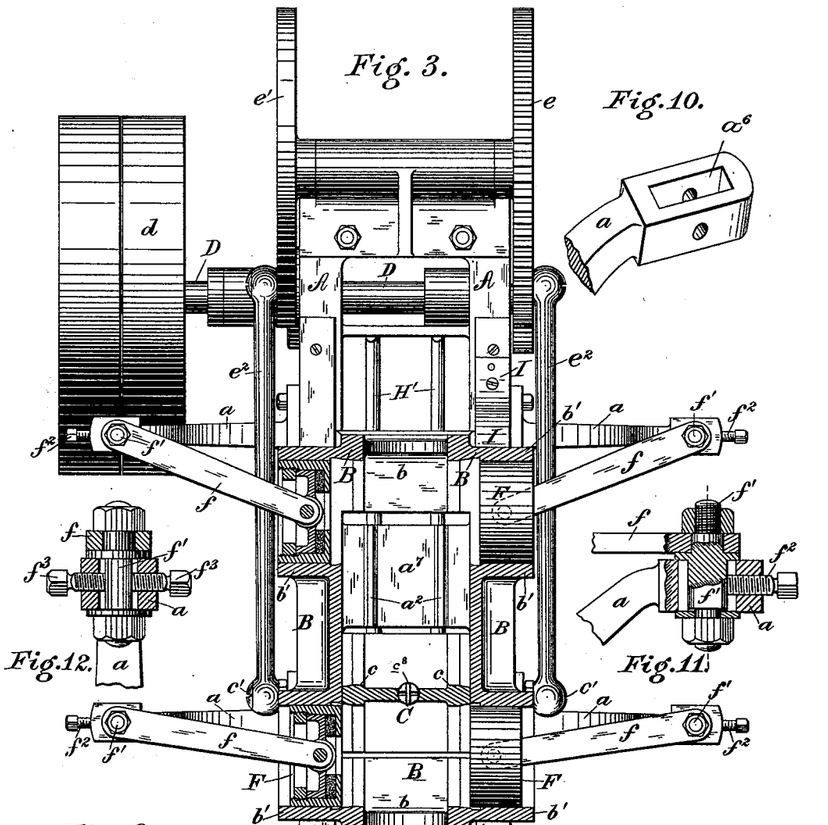
Fig. 3 is a horizontal section on the line X X, Fig. 1.
Fig. 10 is a perspective view of the end of arm $a$.
Fig. 11 is a longitudinal section through said end, showing the adjustable connection of the toggle-lever.
Fig. 12 is a cross-section of the same.
Figures 6, 15, 16, 18:
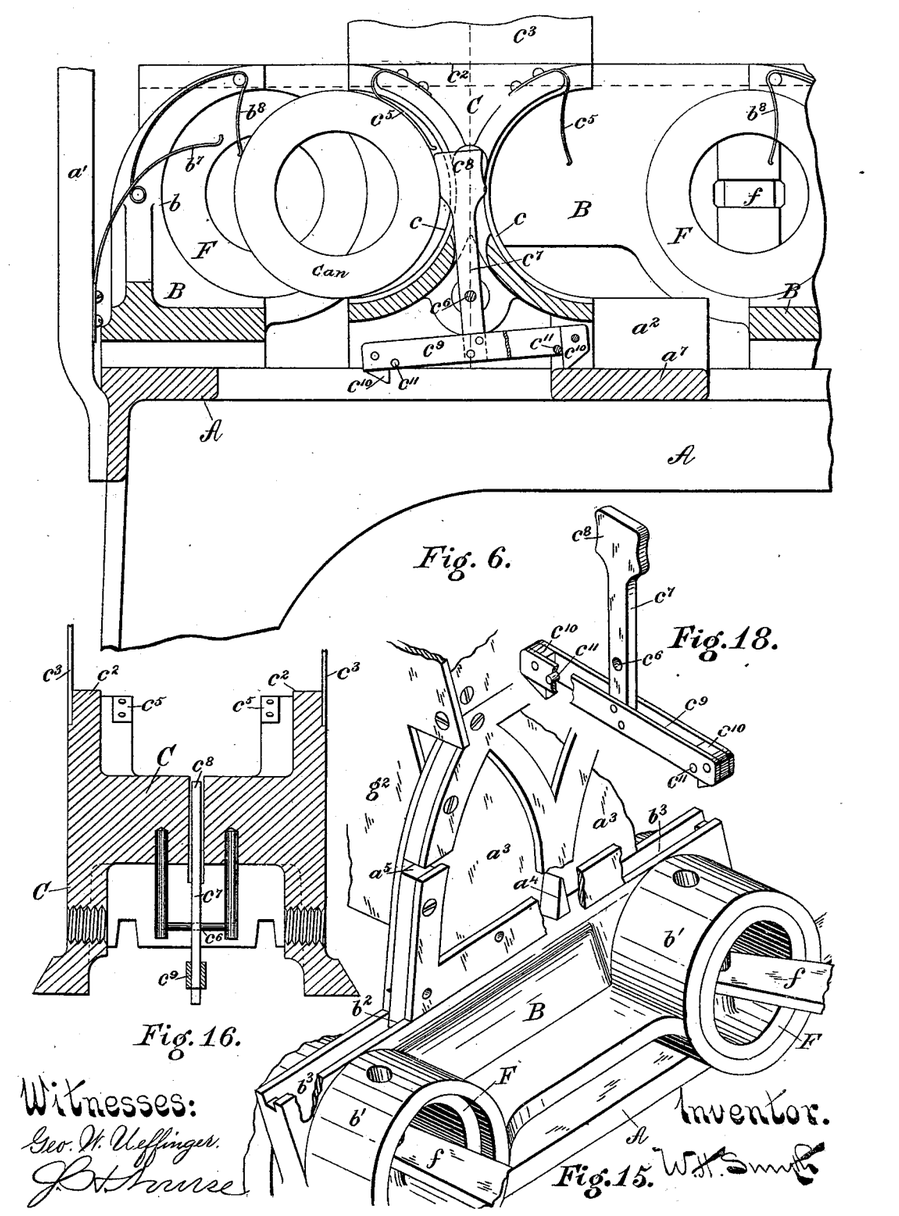
Fig. 6 is a vertical longitudinal section of a portion of the machine, the cross-head moving on its return-stroke.
Fig. 15 is a perspective detail of the side of the carriage and channel $a^3$.
Fig. 16 is a vertical cross-section of cross-head C.
Fig. 18 is a perspective view of lever $c^7$ and cross-foot $c^9$.

The sides of the carriage B at each end are formed with the seats $b'$, Fig. 15, for the pressers F, which are made to move in and out by means of toggle-levers $f$, the inner ends of which are pivoted to the pressers, and their outer ends are pivoted to the rigid arms $a$, secured to the stand A, Fig. 3. Their movement is effected by the stroke of the carriage, being forced inwardly as the levers $f$ approach a line in a plane at right angles to the travel of the carriage and being pulled outwardly as they recede therefrom.

The general operation of the machine can now be understood.

Suppose a can-body to be fitted in the receiving-jaw $b$ of the carriage, and a can-head to be located at each end of the body and in front of the pressers F. Now by operating the power-shaft the cross-head C is moved up until its jaw $c$ fits the can-body and clamps it between itself and the receiving-jaw $b$ of the carriage. A further movement of the cross-head in the same direction, acting through the can-body against the carriage B, moves said carriage in the same direction. This movement of the carriage causes the levers $f$ to force the pressers F inwardly, which, acting on the can-heads, force them upon the can-body, fully fitting them as the levers reach a line in a plane at right angles to the travel of the carriage. Further movement in the same direction causes said levers to retract the pressers, and when the limit of the stroke is reached and the cross-head moves on its return-stroke, leaving the carriage, the headed can is relieved of the jaws and is discharged below. A second can-body being in the receiving-jaw at the other end of the carriage, and heads being placed at its ends in front of the pressers at that end of the carriage, said can will be operated upon by the cross-head on its return-stroke, clamping the body, moving the carriage, and thus operating the toggle-levers. The can is thereby headed and is discharged when relieved by the cross-head proceeding once more on its forward stroke.

Now, in order to feed the can-bodies properly and without interference to each end of the machine successively, I have the following constructions: The stand A has a skeleton frame, $a'$, which supports at its upper part the runway G, Fig. 7, for feeding the can-bodies. At its lower end this runway has an opening, $g$, guarded on its back by a guide-plate, $g'$, and on its front by a guide-plate, $g^2$, the latter extending upwardly and curved backwardly at $g^3$, to form a suitable guide to direct the can-bodies down through the opening $g$ and prevent their rising under the pressure of can-bodies behind, Figs. 2 and 7. The top $c^2$ of the cross-head C, lying between the sides of the carriage B, forms a temporary rest or support for the can-body, Fig. 7, and the guide-plates $g'$ and $g^2$ extend downwardly nearly to the top $c^2$ of said cross-head. Secured firmly to the sides of the cross-head are upwardly-extending flange-plates $c^3$, Figs. 2 and 7, which pass up by each side of the guide-plates $g'$ and $g^2$, Figs. 4 and 8, and have at their tops the inwardly-projecting supporting-flanges $c^4$ at each end of each flange-plate, Fig. 7. The stand A has fixed in its top a supporting rib or ribs, $a^2$, Figs. 2 and 8, over which the cross-head C is grooved and by which it passes, said plates extending up to the level of the base of the clamping-jaws $c$ of said cross-head, Fig. 2.

Figure 19:
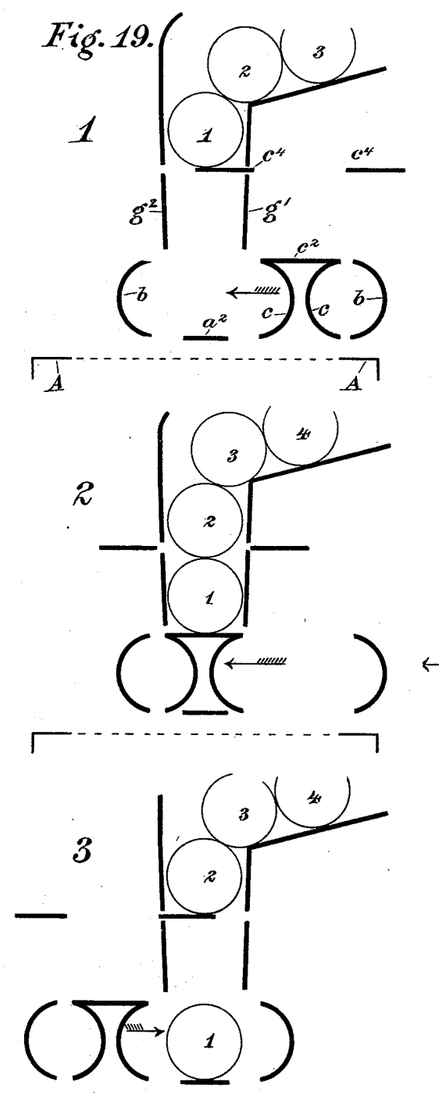
Fig. 19 includes Diagrams 1, 2, 3, 4, 5, and 6, showing the course of the can-bodies.

The operation, which will be best understood from Fig. 19, is as follows: To avoid confusion, I will state that I call the power-shaft end of the machine the "rear" end and the other the "forward" end, and, referring to Figs. 19 and 20, the rear end is to the right and the forward end to the left hand. Suppose the cross-head and the carriage to be at the limit of their back-stroke, as shown in Diagram 1, Fig. 19. Now, a can-body, 1, placed in the runway G, will pass down into the opening $g$, and will temporarily rest upon the supporting-flanges $c^4$ at the forward ends of the flange-plates $c^3$ of the cross-head C. This is the position shown in Diagram 1, Fig. 19. Now, the cross-head being moved on its forward stroke, the supporting-flanges $c^4$ are moved forward away from under the can-body, and said body is relieved from their support just as the top $c^2$ of the cross-head arrives in position directly under the can-body, which thereupon drops on said top and temporarily remains there. This is the position shown in Diagram 2, Fig. 19. A second can-body, 2, having passed down the runway, now lies in the opening $g$ and is supported upon the first can-body, Diagram 2, Fig. 19. The continued movement of the cross-head on its forward stroke now has the effect of picking up the carriage B and moving it with it, also the carrying of the first can-body resting on its top $c^2$ against the forward guide-plate, $g^2$, of the runway-opening, and also the bringing forward under the second can-body of the rear supporting-flanges, $c^4$, of the flange-plates $c^3$ of the cross-head. This is shown in Diagram 3, Fig. 19. By the last-named movement the second can-body is supported positively on the flanges $c^4$, by the second-described movement the first can-body is pushed rearwardly off the cross-head top by the forward guide-plate, $g^2$, and by the first-named movement the receiving-jaw $b$ at the rear end of the carriage is brought close enough up to the fixed supporting-ribs $a^2$ to prevent the can-body from falling through. Said can-body now rests upon the ribs $a^2$, as shown in Diagram 3, Fig. 19. Now the cross-head begins to move on its back-stroke, leaving the carriage stationary, as heretofore described. It soon reaches the first can-body, and, pressing against it with its clamping-jaw $c$, carries it fully into the receiving-jaw $b$, so that the can-body is now fully embraced by the two jaws, Diagram 4, Fig. 19. The cross-head, in moving up to this position on its back-stroke, removes the rear supporting-flanges $c^4$ from under the second can-body, and said body thereupon drops down onto the cross-head top $c^2$, while a third can-body passes down into the opening $g$ and rests on the second can-body, Diagram 4, Fig. 19. The continued movement of the cross-head proceeding on its back-stroke clamps the first can-body between the two jaws, and, through its intervention, picks up the carriage B and moves it backwardly, Diagram 5, Fig. 19, so that the can-body being carried back is firmly held and subjected to the action of the pressers F in putting on its heads; but this continued movement of the cross-head simultaneously effects three other results, namely: It brings the forward supporting-flanges $c^4$ under the third can-body, Diagram 5, Fig. 19, to support it; it brings the second can-body, resting on the cross-head top, backwardly against the back guide-plate, $g'$, of the runway-opening $g$, so that said second can-body is pushed forwardly off the forward end of the cross-head onto the ribs $a^2$, Diagram 5, Fig. 19, and it brings the forward receiving-jaw $b$ of the carriage close enough to the forward end of the fixed supporting-ribs $a^2$ to prevent said second can-body from dropping through the stand. Now the cross-head C, having completed its back-stroke, and the first can-body having been headed by the pressers F, proceeds on its forward stroke, leaving the carriage stationary at the back limit of its stroke, Diagram 6, Fig. 19. As it leaves the carriage, the first can-body, headed as mentioned, is relieved of the two jaws $b$ and $c$, in which it was held, and by the time said cross-head reaches the second can-body in the forward receiving-jaw the first can-body drops out through the open top of the stand, the space between the rear receiving-jaw $b$ of the carriage and the rear end of the fixed ribs $a^2$ being ample, as said jaw $b$ is then removed from the ribs by the greatest distance, all as shown in Diagram 6, Fig. 19. The headed first can-body is thus discharged, and, falling upon a runway H in the stand below, is directed away from the machine. This movement of the cross-head up to the second can-body in the forward receiving-jaw of the carriage B causes the forward clamping-jaw, $c$, of said cross-head to move the second can-body forward, so as to be fully embraced by the two jaws, and this movement also results in removing the forward supporting-flanges, $c^4$, from under the third can-body, so that said can-body drops down onto the cross-head top $c^2$, while a fourth can-body passes down into the opening $g$ and rests on the third can-body, Diagram 6, Fig. 19. The cross-head being moved farther on its forward stroke clamps the second can-body between its jaw and the receiving-jaw of the carriage, and through its intervention moves the carriage forward, and the can-body, being carried along, is brought into position to be headed by the forward pressers, F. This movement of the cross-head and carriage effects three other results, namely: It brings the rear supporting-flanges $c^4$ under the fourth can-body to temporarily support it in the same position as shown for body No. 2 in Diagram 3, Fig. 19; it brings the third can-body, resting on the cross-head top, into contact with the forward guide-plate, $g^2$, of the runway-opening, whereby said can-body is pushed backwardly off the rear end of the cross-head, as shown with regard to body 1 in said Diagram 3, and it brings the back receiving-jaw, $b$, of the carriage B close enough to the rear end of the fixed supporting-ribs $a^2$ to prevent the third can-body from dropping down. Now the cross-head proceeds again on its back-stroke, and thus relieves the second can-body, which, being headed, is dropped down through the open top of the stand and discharged by a runway H' thereunder. The operation then proceeds as heretofore described, the machine discharging a headed can from each end at each stroke of the cross-head.

To feed the heads to each end successively and without interference, I have the following constructions: On each side of the runway G are formed narrow runways $g^4$, Fig. 5, between spaced or separated plates, and these runways communicate at their lower ends with guide-channels $a^3$, Figs. 15 and 8, formed between separated plates in each side of the skeleton frame $a'$ of stand A. These channels are each divided near their lower portion by a vertical rib, $a^4$, thus forming in each a forward portion and a back portion. The bases of these channels communicate with shallow grooves $b^2$, Figs. 7 and 8, formed in the sides of the carriage B, and the ends of these grooves open out into slots $b^3$ in the ends of the carriage, which slots open down into the ends of the receiving-jaws $b$ of said carriage, so as to direct the can-heads into the ends of said jaws directly in front of the pressers F, Figs. 5 and 15.

Figure 4:
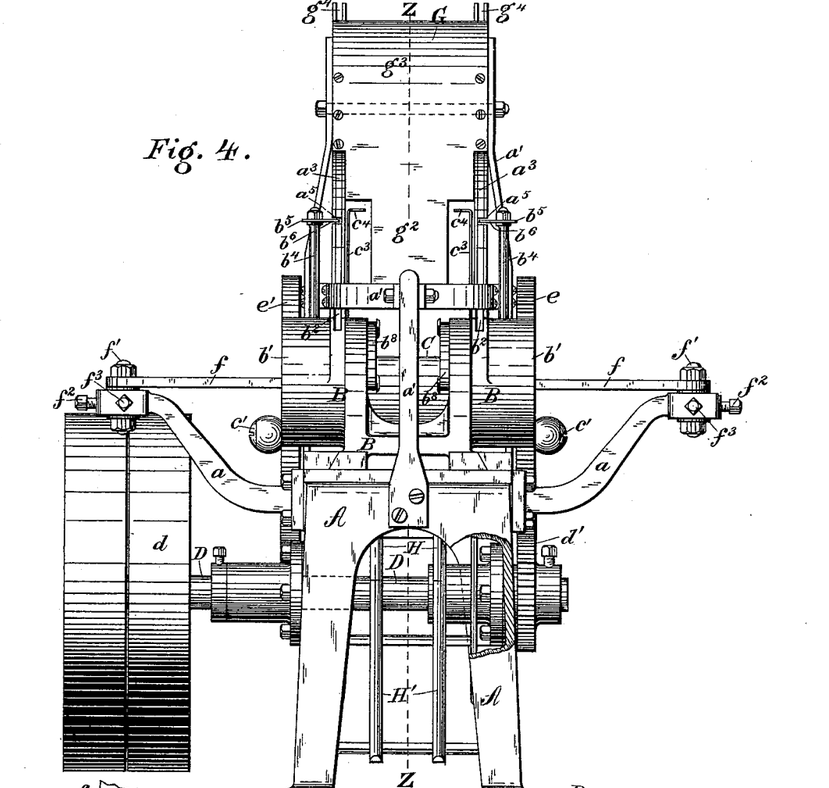
Fig. 4 is an end elevation.
Figure 5:
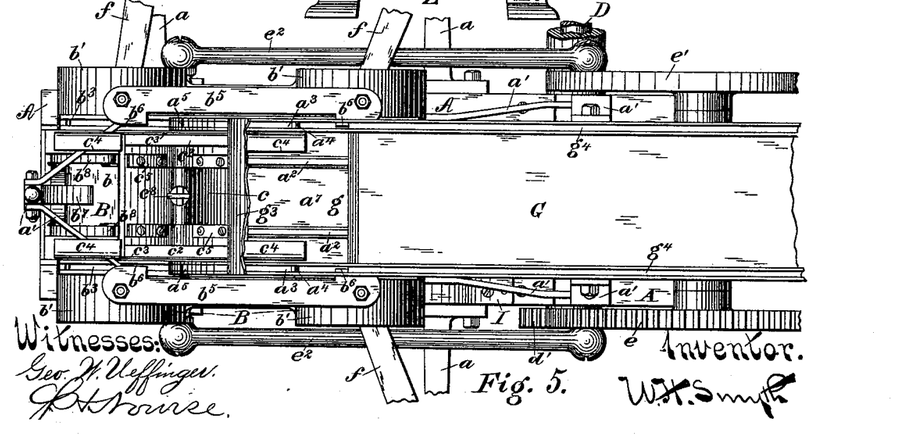
Fig. 5 is a plan.

Supported from carriage B on each side by standards $b^4$ are plates $b^5$, having stop-flanges $b^6$ at each end, Figs. 4 and 5. These flanges project inwardly and traverse the guide-channels $a^3$, Figs. 5, 8, and 4, the outer walls of said channels being grooved or slotted, as shown at $a^5$, Fig. 15, to permit the stop-flanges to move back and forth with the carriage B.

Figure 1:
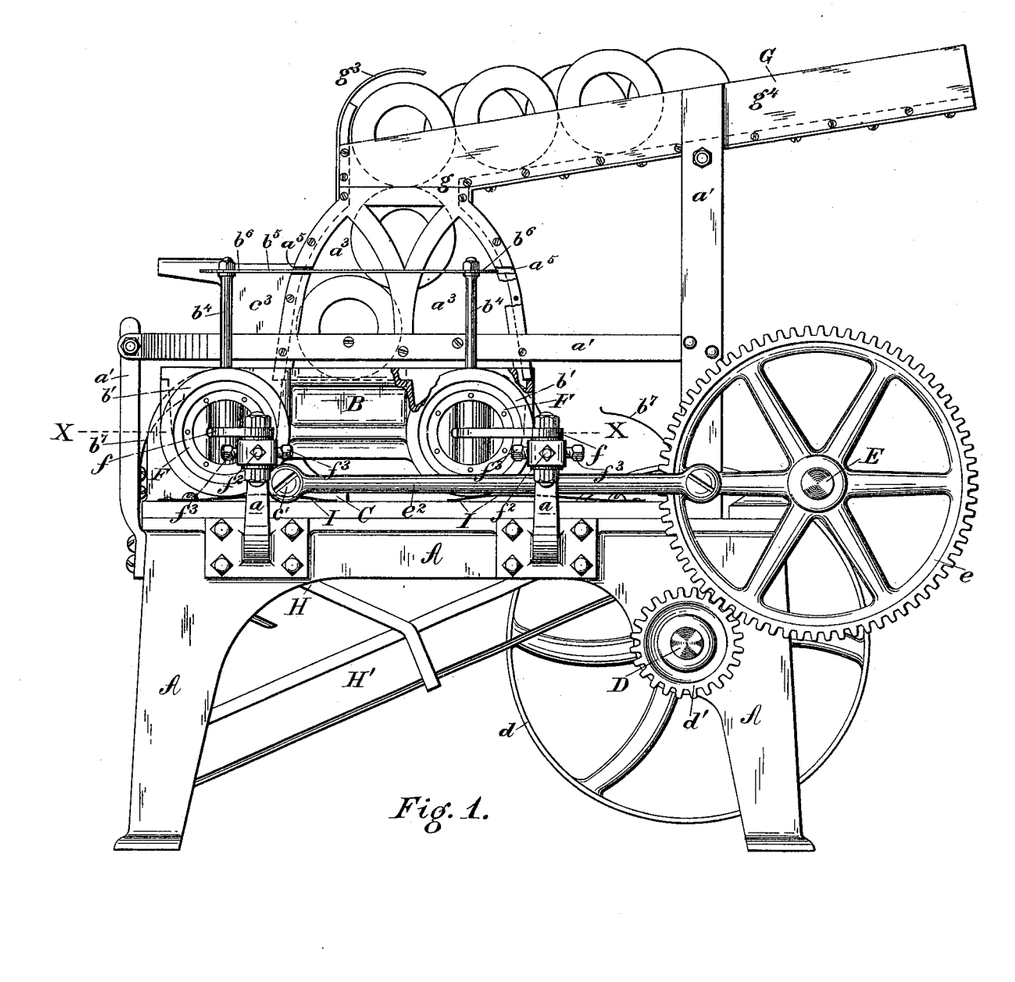
Figure 1 is a side elevation of my machine.
Figure 20:
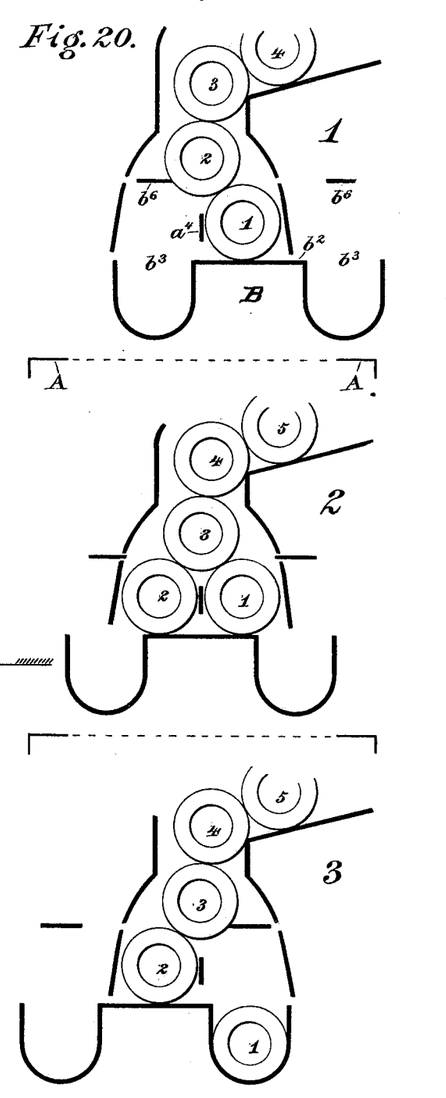
Fig. 20 includes Diagrams 1, 2, 3, 4, 5, and 6, showing the course of the can-heads, the opposing diagrams in the two series representing practically simultaneous operations.

The operation is as follows, and will be readily understood by reference to Fig. 20, Sheet 7: Suppose the cross-head C and carriage B to be at the extreme limit of their back-stroke. Head No. 1, having been placed in runway $g^4$, passes down therein and drops into guide-channel $a^3$ centrally. In this channel said head, meeting with the forward stop-flange $b^6$, which crosses said channel, and in this position lies in the forward portion thereof, is thereby directed backwardly into the back portion of said channel, and it falls therein low enough to rest its base in the shallow groove $b^2$ of the carriage, being temporarily supported in this position, its back and front edges lying between the back wall of the channel and the divisional rib $a^4$. This position is shown in Diagram 1, Fig. 20. Head No. 2, following head No. 1, drops into the guide-channel $a^3$, and rests its base upon and between said head No. 1 and the forward stop-flange, $b^6$, being thus supported centrally in the top of the guide-channel, Fig. 1, also Diagram 1, Fig. 20. The cross-head C now proceeds upon its forward stroke and picks up the carriage B, as heretofore described, so that said carriage proceeds upon its forward movement. As the carriage moves forward, it carries with it the forward stop-flange, $b^6$, which, moving from under head No. 2, allows said head to drop down into the front portion of guide-channel $a^3$, in this position resting in the shallow groove $b^2$ of the carriage, and between the front wall and divisional rib $a^4$ of the guide-channel, and in the same relative position to head No. 1. This is shown in Diagram 2, Fig. 20. Head No. 3 now drops centrally into the top of guide-channel $a^3$ and rests on the two heads below, (same diagram.) The further forward movement of the carriage B now brings the slot $b^3$ at its rear end under head No. 1, which thereupon drops through said slot into the end of the back receiving-jaw $b$ of the carriage, and directly in front of presser F, Diagram 3, Fig. 20. By this same movement of the carriage the back stop-flange $b^6$ is brought forward into the guide-channel $a^3$ and holds up head No. 3, which is thus prevented from following head No. 1, and said head No. 3 now rests upon and between head No. 2 and the back stop-flange $b^6$, Diagram 3, Fig. 20. The cross-head and carriage now proceed upon their back-stroke. The first effect is to remove the back stop-flange $b^6$ from under head No. 3, which thereupon drops down into the back portion of guide-channel $a^3$ and rests in the shallow groove $b^2$ of the carriage and between the rear wall of the guide-channel and the divisional rib thereof, Diagram 4, Fig. 20. Head No. 4 now drops down into the top of guide-channel $a^3$ and rests upon heads Nos. 2 and 3, (same diagram.) By this time the rear toggle-lever, $f$, having reached a line in a plane at right angles to the travel of the carriage, has forced in the presser F and put head No. 1 onto can-body No. 1. Further backward movement of the carriage brings the forward slot, $b^3$, thereof under head No. 2, which thereupon drops through it into the end of the receiving-jaw of the carriage, the presser F at that end being now withdrawn, as its toggle-lever has become inclined again, Diagram 5, Fig. 20. This latter movement of the carriage also brings the forward stop-flange $b^6$ up under the head No. 4, and supports said head between itself and head No. 3, (same diagram.) When the cross-head proceeds again upon its forward stroke, the headed can in the rear end is discharged, as heretofore described, and as shown in Diagrams 6, Figs. 19 and 20, and as the carriage is picked up and proceeds with the cross-head the head 2 in the forward end is pressed upon the can, and said can is discharged on the backward stroke, as heretofore described.

The above description of the operation of feeding the heads applies to both sides of the machine, one side feeding the bottoms of the cans and the other side the tops.

The feeding of the heads is of course timed to correspond to the feed of the bodies, so that each shall be in place at the proper time. This can be understood from Figs. 19 and 20. The opposing diagrams in the two figures show the corresponding positions of the bodies and heads.

The following constructions for insuring the full and accurate result of the operation of the machine will now be readily understood:

As before stated, the carriage B derives its movement from the cross-head $c$ through the intervention of the can between the jaws $b$ and $c$. The jaws do not come in direct contact, but they fit the can so perfectly that though the latter is subjected to great pressure it will not buckle. This pressure, being equal, holds the can in perfect form, and if not in such form at first throws it into form. Now if the carriage B were to move too easily when picked up by the cross-head the can might not be forced into proper place and form, and there would then be danger of the heads not fitting. To prevent the carriage B from being started too easily and to cause it to offer sufficient resistance at first to properly place the can, I secure to the top of the sides of the stand A the springs I, Fig. 1. These have their outer ends screwed down fast, while their inner ends, extending toward each other, lie on the top of the frame sides and are loose and bent upwardly near the end. The carriage B rests and travels directly upon these springs, and their free raised ends sufficiently retard the start of the carriage to offer the necessary resistance.

The pivot-connection of the toggle-levers $f$ with the arms $a$, though it might be a fixed one, is preferably adjustable. As these levers require to be accurately adjusted, I provide for effecting their adjustment laterally as well as longitudinally. The hole $a^6$ in the arms $a$, through which the pivot-pins $f'$ pass, is made large enough to permit the movement of said pin sidewise as well as back and forth, Figs. 10, 11, and 12. A set-screw, $f^2$, passing through the end of arm $a$ and acting against the pin, effects the longitudinal adjustment, while a set-screw, $f^3$, on each side of the arm end effects the lateral adjustment.

Figures 2, 13, 14:
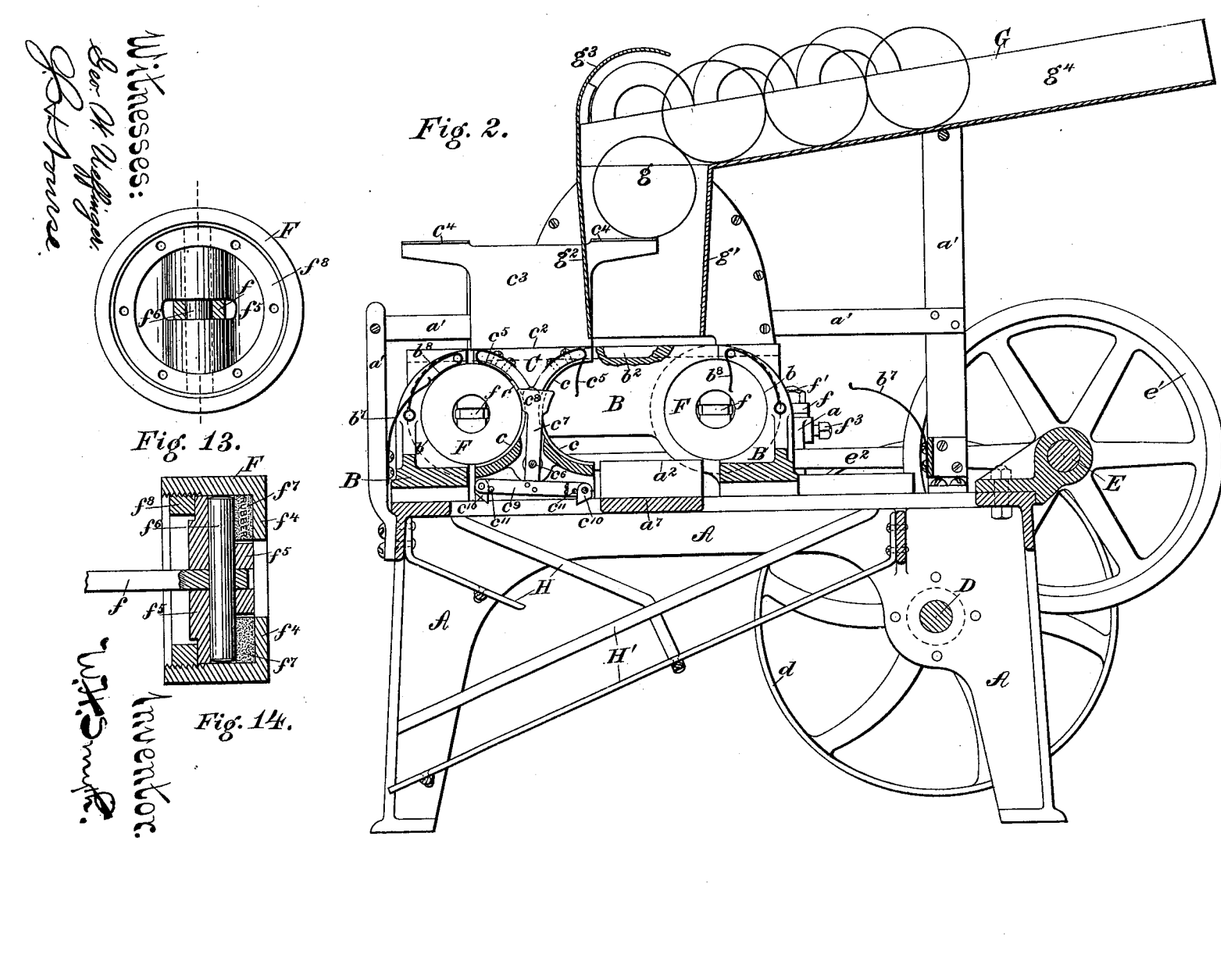
Fig. 2 is a vertical longitudinal section of the same on line Z Z, Fig. 4, the cross-head and carriage being at the limit of their forward stroke.
Fig. 13 is a front view of presser F.
Fig. 14 is a vertical section of same.
Figure 9:
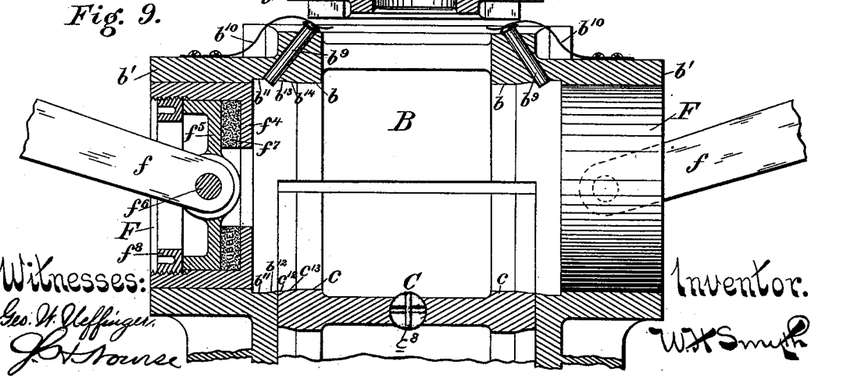
Fig. 9 is a horizontal section through the jaws $b$ and $c$ and pressers F.

In order to provide for a yielding pressure on the can-heads in applying them, I construct the pressers F as shown in Figs. 14 and 9. The outer ring or shell of the presser has a flange, $f^4$, at its inner end, and its outer end is internally threaded. Into the shell is fitted the bearing-plate $f^5$, which receives the pivot-pin $f^6$ of the toggle-lever $f$. Between the face of this plate and the flange $f^4$ of the shell is a cushion formed of an annular piece or ring of rubber, $f^7$. Into the internally-threaded outer end of the shell is screwed a gland-nut, $f^8$, which bears up against the back of the bearing-plate $f^5$ and holds all the parts together. It will be seen that the shell pressing with its flange $f^4$ against the can-head will yield to the extent of the cushion $f^7$, and this yielding can be regulated by setting the gland-nut $f^8$ in or out to compress or relieve the cushion, and the presser may be readily taken apart to renew or repair any part.

As a general rule the cans, when headed and relieved by the receding clamping-jaw, as heretofore described, will drop out of the receiving-jaws $b$ and be discharged by gravity; but in order to render their discharge positive and immediate I have the springs $b^7$.

Figures 7, 8:
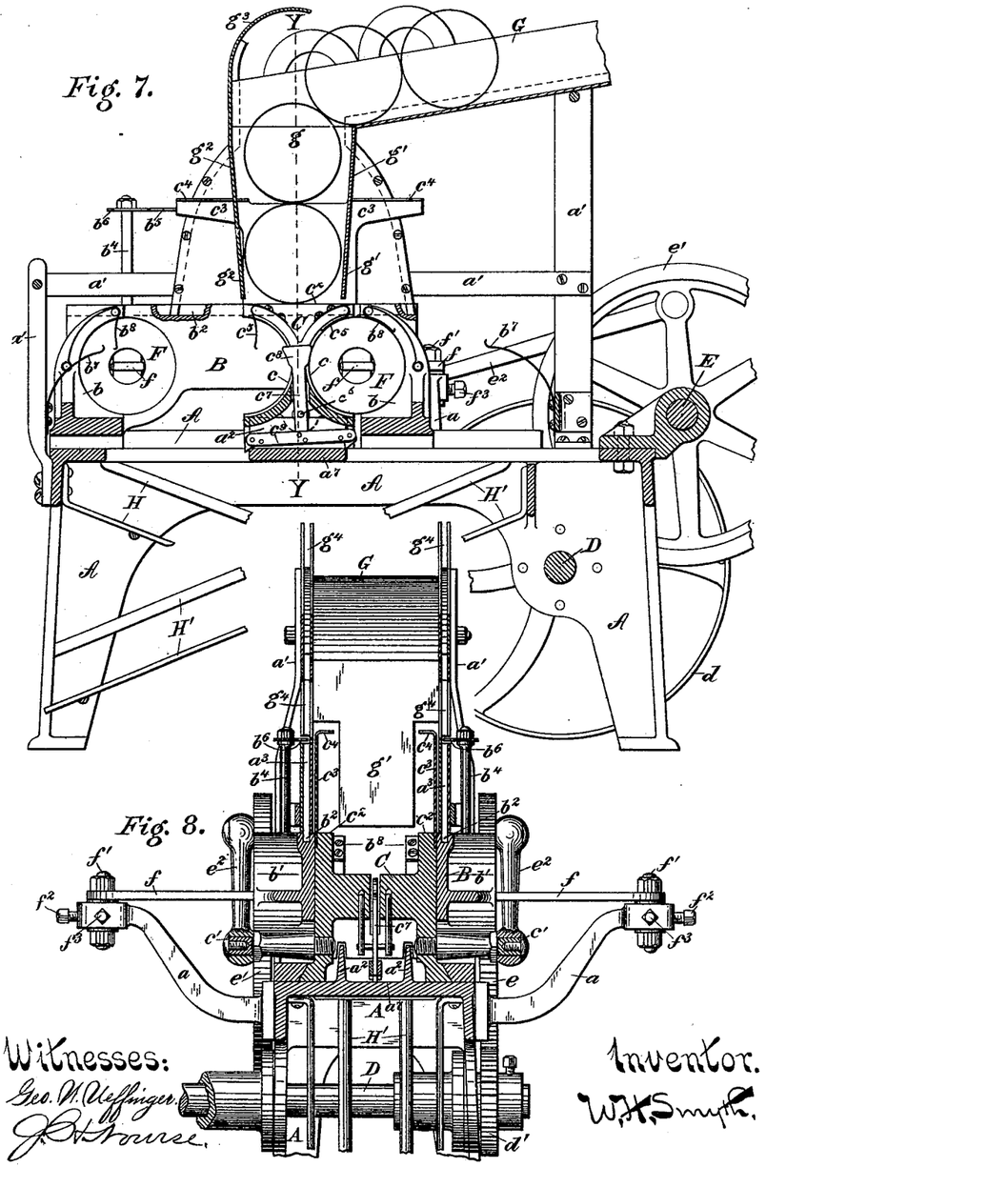
Fig. 7 is a section showing the cross-head at about the middle of its stroke.
Fig. 8 is a vertical cross-section on line Y Y, Fig. 7.

(Seen best in Figs. 6 and 7.) These are secured firmly at their lower ends to the lower portion of the ends of the skeleton frame $a'$ of the stand A. Their upper free ends extend inwardly, and are adapted to press against the cans through the backs of the receiving-jaws $b$, which are open. When the carriage B is forced up to the end of its stroke, the can comes in contact with the end of the spring $b^7$ and forces it back and up. Then as soon as the cross-head C relieves the can the spring $b^7$ throws it down and out positively. To assist in this result and to give the can a positive downward movement to insure its discharge, I have secured to the upper sides of the receiving-jaws $b$ the springs $b^8$ and to the upper sides of the clamping-jaws $c$ the springs $c^5$, Fig. 6. These springs are sufficiently flexible to bend down over the top edge of each jaw and to yield to the can therein, Fig. 2, which forces them to conform to the curvature of the cans; but when the can is relieved they press downwardly upon it, and together with the spring $b^7$ discharge it. If, however, it should be inclined to stick in the receding clamping-jaw $c$ of the cross-head C, I have the following device for forcing it out. This is seen best in Fig. 6. Pivoted at the point $c^6$ in the base of the cross-head C is a lever, $c^7$, which extends upwardly in the center of the cross-head, and has an enlarged head, $c^8$, the edges of which on each side are adapted to project into each clamping-jaw alternately through an opening therein. The lower end of the lever below its pivotal center has a cross-foot, $c^9$. In each end of this foot is a pivoted cam-lug, $c^{10}$, each of which can move outwardly, but not inwardly, being limited in the latter direction by cross-pins $c^{11}$. These lugs are in the plane of and are adapted to come in contact with the cross base-plate $a^7$ of the fixed supporting-ribs $a^2$ of the stand.

Referring to Fig. 2, it will be seen that the cross-head and carriage are at the limit of their forward stroke and embrace a can between them, the edge of the lever-head $c^8$ being forced back. Now, when the cross-head moves on its return-stroke and the can, forced forwardly by spring $b^7$ and downwardly by springs $b^8$ and $c^5$, has a tendency to stick in the clamping-jaw $c$ of said cross-head, then the cam-lug $c^{10}$ at the rear end of the cross-foot $c^9$, coming in contact, Fig. 6, with the fixed base-plate $a^7$, and being unable to yield by reason of the cross-pin $c^{11}$, travels up on said plate, Figs. 6 and 7, thereby turning the lever $c^7$ on its pivot and throwing the forward edge of its head $c^8$ into the clamping-jaw, so that said edge presses on the can and flips it out. The cam-lug $c^{10}$ at the forward end of the cross-foot offers no interference, as upon coming in contact with the plate $a^7$ it turns outwardly on its pivot and passes over the plate. The operation is reversed on the forward stroke. When the head drops down through the slot $b^3$ in the end of the carriage side, so as to fall in position in front of the presser, ready to be forced onto the can when the latter is brought to position, it may be necessary to provide for holding said head in a perfectly-upright position and prevent it from tipping inwardly. At the inner edge of the head this is effected by the can-body itself, which, just before the head drops through slot $b^3$ to position, has dropped down from the cross-head top onto the supporting-ribs $a^2$ and receiving-jaw $b$, so that its end overlaps the inner edge of the head and serves to support it; but for supporting the outer edge of the head I have the sliding latch-pins $b^9$, Fig. 9, mounted in the receiving-jaws $b$ near each end thereof. Springs $b^{10}$ act on the heads of these pins and hold them normally in, so that their inner ends project through the back of the jaws $b$. The pins are seated at an angle, as shown, in order to present their inner ends at an inclination or bevel. The head drops down outside of the pin ends and rests against them, the springs of said pins being sufficient to keep them in position, so as to hold the head up; but when the presser F moves inwardly the head is readily pushed past the inclined end of the pin, which yields before it and when relieved returns to position.

Figure 17:
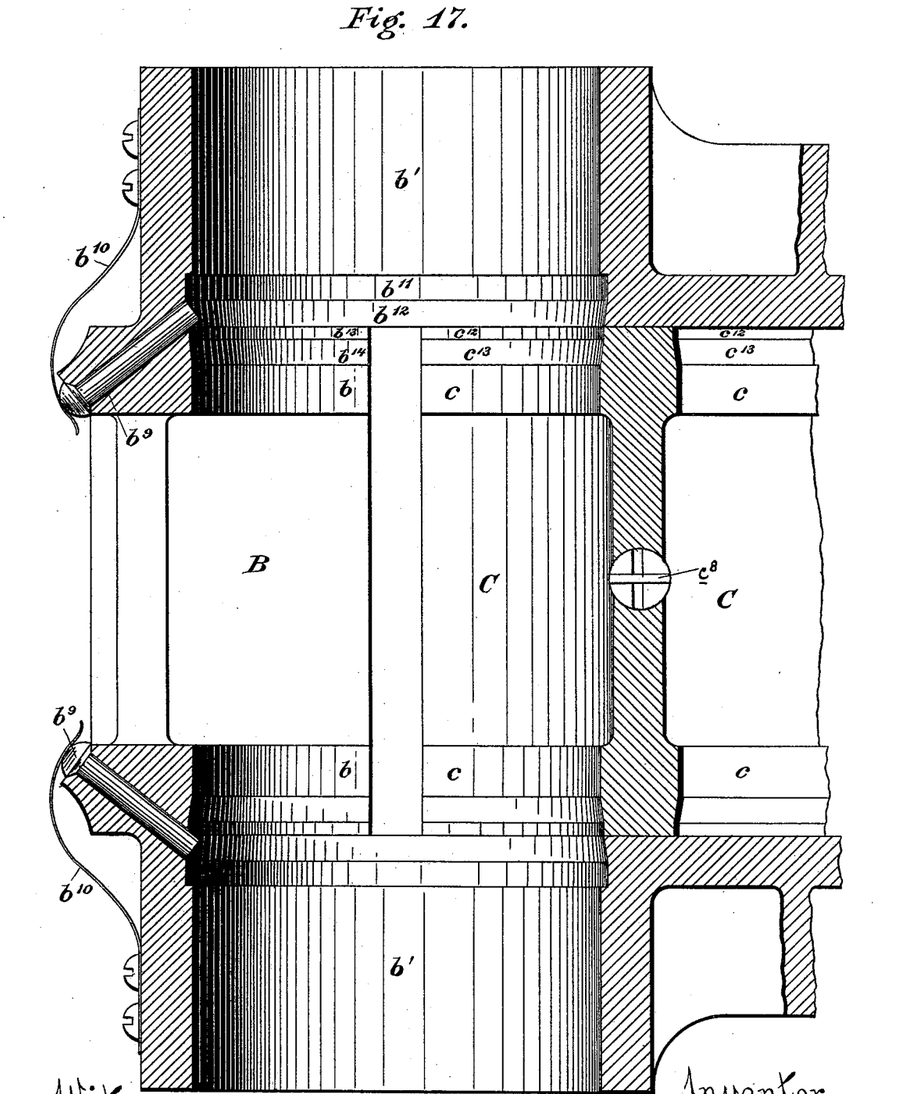
Fig. 17 is a sectional view on a larger scale than Fig. 9, showing the taper and cylindrical portions for the heads.

In Fig. 9, and particularly in Fig. 17, I show the particular formation of the seats for the can-heads.

The spaces in the carriage ends, into which the can-heads are received from the slots $b^3$, are formed with straight planes, (shown at $b^{11}$,) and are enough larger in diameter than the heads, and their width is sufficient to insure the full reception of said heads. The surfaces adjoining these straight planes $b^{11}$ are also situated in the spaces for the reception of the heads and are inwardly tapered, as shown at $b^{12}$, and they extend up to the plane of the ends of the jaws $b$ and $c$. Then the back of jaw $b$ is continued in straight planes, as at $b^{13}$, and the ends of the cross-head jaw $c$ join the tapering planes $b^{12}$ by straight planes $c^{12}$, corresponding to the straight planes $b^{13}$ of jaw $b$. A second tapering plane, $b^{14}$, is formed in jaw $b$, joining the straight plane $b^{13}$, and a correspondingly-tapering plane, $c^{13}$, is formed in jaw $c$, joining the straight plane $c^{12}$. The effect of these constructions is as follows: The head is moved by the presser F easily along the straight plane $b^{11}$, and then coming to the tapering plane $b^{12}$ is by it accurately centered and directed upon the can end; but if the can be not close up to the tapering plane then the straight planes $b^{13}$ and $c^{12}$ direct the head accurately and straight onto the can, and, finally, the tapering planes $b^{14}$ and $c^{13}$ press and bind the head-flange around the can.

Having thus described my invention, what I claim as new, and desire to secure by Letters Patent, is—

1. In a can-heading machine, the combination of a moving cross-head having a jaw for fitting one side of the can, a movable carriage having a jaw for fitting the other side, whereby the can is held between the jaws and moved with them, said carriage also receiving and carrying the heads, and pressers adapted to force the heads on the cans while the parts are in motion, substantially as described.

2. In a can-heading machine, the combination of a moving cross-head having a jaw for fitting one side of the can, a movable carriage having a jaw for fitting the other side, movable pressers, and connections for operating them through the movement of the carriage, said pressers being seated in the carriage at each end of its jaw for forcing the heads on the can, substantially as described.

3. In a can-heading machine, the combination of a moving cross-head having a jaw for fitting one side of the can, a movable carriage having a jaw for fitting the other side, pressers seated in the carriage at each end of its jaw for forcing the heads on the can, and pivoted toggle-levers operated by the movement of the carriage to operate the pressers, substantially as described.

4. In a can-heading machine, the combination of a stand having fixed side arms, a moving cross-head mounted on said stand and having a jaw for fitting one side of the can, a movable carriage mounted on the stand and having a jaw for fitting the other side of the can, pressers seated in the carriage at each end of its jaw for forcing the heads on the can, and toggle-levers pivoted to the pressers and to the fixed arms of the stand, whereby they operate the pressers through the movement of the carriage, substantially as described.

5. In a can-heading machine, the combination of a moving cross-head having a jaw for fitting one side of the can, a movable carriage having a jaw for receiving the other side of the can, said carriage being mounted in the path of the cross-head, whereby it derives its movement therefrom, pressers seated in the carriage at each end of its jaw for forcing the heads on the can, and power-connections with the pressers for operating them through the movement of the carriage, substantially as described.

6. In a can-heading machine, the combination of a moving cross-head having a jaw for fitting one side of the can, a movable carriage having a jaw for receiving the other side of the can, the jaws clamping the can between them, said carriage being mounted in the path of the cross-head, whereby it derives its movement therefrom through the intervention of the can, pressers seated in the carriage at each end of its jaw for forcing the heads on the can, and power-connections with the pressers for operating them through the movement of the carriage, substantially as described.

7. In a can-heading machine, the combination of a stand having fixed side arms, a moving cross-head mounted on the stand and having a jaw for fitting one side of the can, a movable carriage mounted on the stand and having a jaw for receiving the other side of the can, said carriage being mounted in the path of the cross-head, whereby it derives its movement therefrom, pressers seated in the carriage at each end of its jaw for forcing the heads on the cans, and toggle-levers pivoted to the pressers and to the fixed arms of the stand, whereby they operate the pressers through the movement of the carriage, substantially as described.

8. In a can-heading machine, the combination of a reciprocally-moving cross-head having a jaw on each side, a movable carriage having a jaw in each end and mounted over the cross-head, whereby it lies in the path thereof and derives a reciprocating movement therefrom, pressers seated in each end of the carriage at each end of its jaws, and power-connections with the pressers for operating them through the movement of the carriage, substantially as described.

9. In a can-heading machine, the combination of a stand having fixed side arms at each end, a reciprocally-moving cross-head mounted on the stand and having a jaw on each side, a movable carriage mounted on the stand and having a jaw in each end, said carriage being over the cross-head and in the path thereof, whereby it derives a reciprocating movement therefrom, pressers seated in each end of the carriage at each end of its jaws, and toggle-levers pivoted to the pressers and to the fixed arms of the stand, whereby they operate the pressers through the movement of the carriage, substantially as described.

10. In a can-heading machine, an open-topped stand having supporting-ribs $a^2$, leaving a discharge-opening for the cans on each side thereof, and the runways H H', communicating with said openings, in combination with a reciprocating cross-head having a jaw on each side, a movable carriage having a jaw in each end and mounted on the stand over and in the path of the cross-head, whereby it receives a reciprocating motion therefrom, pressers seated in the ends of the carriage for forcing the heads on the cans, and power-connections with the pressers for operating them through the movement of the carriage, substantially as described.

11. In a can-heading machine, the combination of a reciprocally-moving cross-head having a jaw on each side, a jaw opposing each of said cross-head jaws and separated sufficiently to permit the movement of the cross-head between them, whereby cans are received between the jaws alternately at each end, and pressers for forcing the heads on the cans when confined by the jaws, substantially as described.

12. In a can-heading machine, a jaw for receiving the can and ribs for temporarily supporting the can, in combination with a moving cross-head having a jaw for clamping the can between it and the receiving-jaw, and a top forming a temporary support for the can before it drops between the jaws, substantially as described.

13. In a can-heading machine, a jaw for receiving the can and ribs $a^2$, for temporarily supporting said can, in combination with a moving cross-head having a jaw for clamping the can between it and the receiving-jaw, and a top on which the can rests before dropping between the jaws, and a fixed plate for pushing the can off the cross-head top by the movement of said cross-head, substantially as described.

14. In a can-heading machine, a jaw for receiving the can and ribs $a^2$, for temporarily supporting said can, in combination with a moving cross-head having a jaw for clamping the can between it and the receiving-jaw, and a top affording a temporary support for the can, a fixed plate for pushing the can off the cross-head top by the movement of said cross-head, and a runway above for feeding the cans, having an opening for directing them upon the cross-head top, substantially as described.

15. In a can-heading machine, a jaw for receiving the can and ribs $a^2$, for temporarily supporting said can, in combination with a moving cross-head having a jaw for clamping the can between itself and the receiving-jaw, and a top affording a temporary support for the can, a fixed plate for pushing the can off the top of the moving cross-head, flange-plate $c^3$, secured to said cross-head and having top flanges, $c^4$, for temporarily supporting the can above the cross-head top, and a runway for the cans, having an opening for directing them onto the flanges $c^4$, substantially as described.

16. In a can-heading machine, the open-topped stand A, having the can-supporting ribs $a^2$, and the movable carriage having a can-receiving jaw and mounted on the stand to move to and from the supporting-ribs $a^2$, in combination with a moving cross-head mounted on the stand and having a jaw for clamping the can between itself and the receiving-jaw of the carriage, substantially as described.

17. In a can-heading machine, the open-topped stand A, having the can-supporting ribs $a^2$, and the movable carriage having a can-receiving jaw and mounted on the stand to move to and from the supporting-ribs $a^2$, in combination with the moving cross-head mounted on the stand and having a jaw for clamping the can between itself and the receiving-jaw of the carriage, said cross-head having a top, $c^2$, for temporarily supporting the can, the fixed plate for pushing the can off the cross-head top, the supporting-flanges $c^4$, carried by the cross-head for temporarily supporting the can above the cross head top, and the runway and opening $g$, for directing the cans onto the supporting-flanges, substantially as described.

18. In a can-heading machine, the open-topped stand A, having the fixed can-supporting ribs $a^2$, and the fixed runway G, having the opening $g$, with back and front guide-plates, $g'$ $g^2$, in combination with the reciprocally-moving cross-head C, mounted on the stand and having a jaw, $c$, on each side and a top, $c^2$, the side plates, $c^3$, carried by the cross-head and having top supporting-flanges, $c^4$, on each end, and the movable carriage B, mounted on the stand over the cross-head and having a receiving-jaw, $b$, at each end, said carriage being in the path of the moving cross-head, whereby it derives a reciprocating motion therefrom, substantially as described.

19. In a can-heading machine, the carriage having a can-receiving jaw in its end, slots $b^3$ in the ends of its sides, for directing the heads into each end of the jaw, and a groove, $b^2$, in the top of its sides, for directing the can-heads to the slots, in combination with runways above for the heads and channels for directing the heads from the runways to the grooves $b^2$ of the carriage, substantially as described.

20. In a can-heading machine, the stand having the frame $a'$, with side plates forming the channels $a^3$, and the runways $g^4$, formed by plates supported by frame $a'$ and communicating with the channels $a^3$, in combination with the carriage mounted on the stand and having a can-receiving jaw, $b$, the slots $b^3$ in the ends of the carriage sides, for directing the heads into the ends of the receiving-jaw, and the grooves $b^2$ in the tops of the carriage sides, communicating with the channels $a^3$ and the slots $b^3$, substantially as described.

21. In a can-heading machine, the stand having the frame $a'$, with side plates forming channels $a^3$, and the runways $g^4$, formed by plates supported by frame $a'$ and communicating with the tops of the channels $a^3$, in combination with the movable carriage B, mounted on the stand and having a can-receiving jaw, $b$, in each end, the slots $b^3$ in the ends of the carriage sides, for directing the heads into the ends of the receiving-jaws, the grooves $b^2$ in the tops of the carriage sides, communicating with the channels $a^3$ and slots $b^3$, and the stop-flanges $b^6$, carried by the carriage and traversing the channels $a^3$, whereby the heads are directed alternately to each end of the carriage, substantially as described.

22. In a can-heading machine, the stand having a frame, $a'$, with side plates forming channels $a^3$, each of which is divided into a forward and back portion by a rib, $a^4$, and the runways $g^4$, formed by plates supported by frame $a'$ and communicating with the tops of the channels $a^3$, in combination with the reciprocating cross-head C, having a jaw, $c$, in each side, the movable carriage B, mounted over and in the path of the cross-head, whereby it derives a reciprocating motion therefrom, said carriage having a jaw, $b$, at each end, slots $b^3$ in the ends of its sides, and grooves $b^2$ in the tops of its sides, communicating with the slots and with the channels $a^3$, and the stop-flanges $b^6$, carried by the carriage and traversing the channels $a^3$, whereby the heads are directed alternately to each end of the carriage, substantially as described.

23. In a can-heading machine, the stand having a frame, $a'$, with side plates forming channels $a^3$, each of which is divided into a forward and back portion by a rib, $a^4$, and the runways $g^4$, formed by plates supported by frame $a'$ and communicating with the tops of the channels $a^3$, in combination with the reciprocating cross-head C, having a jaw, $c$, in each side, the movable carriage B, mounted over and in the path of the cross-head, whereby it derives a reciprocating motion therefrom, said carriage having a jaw, $b$, at each end, slots $b^3$ in the ends of its sides, and grooves $b^2$ in the tops of its sides, and the stop-flanges $b^6$, carried by the carriage and traversing the channels $a^3$, whereby the heads are directed alternately to each end of the carriage, and the pressers F, seated in the carriage ends, substantially as described.

24. In a can-heading machine, the open-topped stand A, having the can-supporting ribs $a^2$ and the fixed arms $a$, the frame $a'$, the runway G for the cans and runways $g^4$ for the heads in the top of the frame, the guide-plates $g'$ $g^2$ in the opening of the runway G, and the divided channels $a^3$, communicating with the ends of runways $g^4$, in combination with the reciprocating cross-head C, mounted on the stand and having a jaw, $c$, in each side, and a can-supporting top, $c^2$, and the side flange-plates, $c^3$, carried by the cross-head and having can-supporting flanges $c^4$, the movable carriage B, mounted on the stand over and in the path of the cross-head, whereby it receives a reciprocating motion therefrom, said carriage having a jaw, $b$, in each end, a slot, $b^3$, in the ends of its sides, and a groove, $b^2$, in the tops thereof for directing the can-heads to each end of the carriage-jaws, and the stop-flanges $b^6$, traversing the channels $a^3$, whereby the heads are directed alternately to each end of the carriage, the pressers F, seated in the carriage ends, and the toggle-levers $f$, pivoted to the pressers and to the fixed arms $a$ of the stand, whereby the pressers are operated through the movement of the carriage, substantially as herein described.

25. In a can-heading machine, the reciprocating cross-head C, and the carriage B, deriving its movement from the cross-head, in combination with the stand and the binding-springs I on the stand-top, and on which the carriage rests and travels, substantially as and for the purpose herein described.

26. In a can-heading machine, the reciprocating cross-head and movable carriage, as described, in combination with the pressers F, seated in the carriage, the fixed arms $a$, the toggle-levers $f$, pivoted to the pressers, and the adjustable connection between the outer ends of the toggle-levers and the arms $a$, consisting of the movable pivot-pins $f'$ and the end and side set-screws $f^2$ $f^3$, substantially as herein described.

27. In a can-heading machine, the pressers F, consisting of a shell having an inner flange, $f^4$, and an internally-threaded outer end, the bearing-plate $f^5$, fitted in the shell and receiving the connecting-pin, the cushion $f^7$ between the face of the bearing-plate and the inner flange, $f^4$, of the shell, and the gland-nut $f^8$, fitted in the internally-threaded outer end of the shell and bearing against the plate $f^5$, substantially as herein described.

28. In a can-heading machine, the open-backed receiving-jaws $b$ and the movable clamping-jaws $c$, between which the cans are held while being headed, in combination with the springs $b^7$, bearing on the cans through the open back of the receiving-jaws for throwing them out when relieved by the clamping-jaws, substantially as herein described.

29. In a can-heading machine, the movable carriage having open-backed jaws $b$, and the moving cross-head having jaws $c$, the cans being held between the jaws $b$ and $c$, in combination with stationary springs $b^7$, adapted to press on the cans through the open backs of the jaws $b$ and throw them out when relieved by the jaws $c$, substantially as herein described.

30. In a can-heading machine, the can-holding jaws $b$ and $c$, in combination with the springs $b^8$ $c^5$ in the tops of the jaws $b$ and $c$, respectively, for bearing down on and throwing the cans downwardly when relieved, substantially as herein described.

31. In a can-heading machine, the can-holding jaws $b$ and $c$, in combination with the springs $b^7$, acting against the backs of the cans, and the springs $b^8$ $c^5$, acting on their tops to throw them outwardly and downwardly when relieved, substantially as herein described.

32. In a can-heading machine, the moving cross-head C, having the jaw $c$ on each side, in combination with the pivoted swinging lever $c^7$, mounted in the cross-head, and having a head, $c^8$, the edges of which are adapted by the swinging of the lever to project alternately into the jaws $c$ on each side, whereby the cans are thrown out of the jaws when relieved, substantially as described.

33. In a can-heading machine, the stand having the cross-plate $a^7$, and the moving cross-head C, having the jaw $c$ on each side, in combination with the pivoted lever $c^7$, mounted in the cross-head, and having a head, $c^8$, the edges of which are adapted to project alternately into the jaws $c$ on each side, the cross-foot $c^9$ of the lever, and the pivoted and limited cam-lugs $c^{10}$ in the ends of the foot, adapted to come in contact with the plate $a^7$ of the stand, substantially as herein described.

34. In a can-heading machine, the carriage B, having the receiving-jaw $b$ for the cans and a space at each end thereof for receiving the can-heads, said space and jaw having the straight planes $b^{11}$, inwardly-tapering planes $b^{12}$, and the straight planes $b^{13}$, respectively, as described, in combination with the cross-head C, having the clamping-jaw $c$, with its ends formed with straight planes $c^{12}$, corresponding to the straight planes $b^{13}$ of jaw $b$ and joining the taper planes of the spaces at the ends of said jaws, substantially as described.

35. In a can-heading machine, the carriage B, having the receiving-jaw $b$ for the cans and a space at each end thereof for receiving the can-heads, said space and jaw having the straight planes $b^{11}$, inwardly-tapering planes $b^{12}$, straight planes $b^{13}$, and inwardly-tapering planes $b^{14}$, respectively, as described, in combination with the cross-head C, having the clamping-jaw $c$, with its ends formed with straight planes $c^{12}$ and inwardly-tapering planes $c^{13}$, substantially as and for the purpose herein described.

In witness whereof I have hereunto set my hand.

W. H. SMYTH.

Witnesses:
GEO. W. UEFFINGER,
S. H. NOURSE.